(12) United States Patent
Acharya et al.

(10) Patent No.: US 7,376,129 B2
(45) Date of Patent: May 20, 2008

(54) ENABLING COLLABORATIVE APPLICATIONS USING SESSION INITIATION PROTOCOL (SIP) BASED VOICE OVER INTERNET PROTOCOL NETWORKS (VOIP)

(75) Inventors: Arup Acharya, Nanuet, NY (US); Dilip Dinkar Kandlur, Yorktown Heights, NY (US); Priya Mahadevan, Durham, NC (US); Zon-yin Shae, South Salem, NY (US); Aameek Singh, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 10/695,856

(22) Filed: Oct. 29, 2003

(65) Prior Publication Data

US 2005/0094621 A1    May 5, 2005

(51) Int. Cl.
    H04L 12/66    (2006.01)
(52) U.S. Cl. ............... 370/352; 370/353; 370/401; 709/229
(58) Field of Classification Search ........ 370/351–357, 370/260–261, 264–265, 270, 262–263, 399, 370/432, 458, 460, 468, 401; 379/202.01, 379/204.01, 205.01; 709/229
See application file for complete search history.

(56) References Cited

U.S. PATENT DOCUMENTS

| | | | |
|---|---|---|---|
| 6,370,137 B1* | 4/2002 | Lund | 370/352 |
| 6,563,816 B1 | 5/2003 | Nodoushani et al. | |
| 2002/0120760 A1 | 8/2002 | Kimchi et al. | |
| 2002/0156900 A1* | 10/2002 | Marquette et al. | 709/227 |
| 2003/0012162 A1 | 1/2003 | Mukherjee et al. | |
| 2003/0067887 A1 | 4/2003 | Truetken | |
| 2003/0097484 A1 | 5/2003 | Bahl | |
| 2003/0120502 A1* | 6/2003 | Robb et al. | 705/1 |
| 2003/0187992 A1* | 10/2003 | Steenfeldt et al. | 709/227 |
| 2003/0215067 A1* | 11/2003 | Ordille et al. | 379/88.13 |
| 2003/0217109 A1* | 11/2003 | Ordille et al. | 709/206 |
| 2005/0036482 A1* | 2/2005 | Goroshevsky et al. | 370/352 |
| 2007/0203741 A1* | 8/2007 | Ordille et al. | 705/1 |
| 2008/0002669 A1* | 1/2008 | O'Brien et al. | 370/352 |

FOREIGN PATENT DOCUMENTS

JP    2003 022223    1/2003

OTHER PUBLICATIONS

Balz Wyss, An Integrated, Flexible Software Platform for Building VoIP-Enabled Client Devices, Microsoft Windows Cc. Net, www.windowsfordevices.com/files, Mar. 2003, pp. 1-27.

(Continued)

Primary Examiner—Bin K. Tieu
(74) Attorney, Agent, or Firm—Keusey, Tutunjian & Bitetto, P.C.; Mark Wardas

(57) ABSTRACT

A method and system for enabling voice over Internet for computer applications includes registering session initiation protocol (SIP) as a system service and providing SIP service through an application programming interface (API) to permit access to service functions by individual software applications. A SIP link is provided within a software application to permit user invocation of SIP service functions. The link may be passed as a parameter to permit external access to an invoked service function.

31 Claims, 6 Drawing Sheets

OTHER PUBLICATIONS

R. Mahy et al., A Call Control and Multi-party usage framework for the Session Initiation Protocol (SIP), IETF Sipping WG Internet-Draft, Mar. 7, 2003, pp. 1-43.

W. Jiang; J. Lennox; S. Narayanan; H. Schulzrinne; K.Singh and Xiaotao Wu; Integrating Internet Telephony Services; IEEE Internet Computing, vol. 6, No. 3, pp. 64-72, May-Jun. 2002; USA.

P. Koskelainen, H. Schulzrinne and Xiaotao Wu; A SIP-based Conference Control Framework; NOSSDAV'02 May 12-14, 2002, pp. 53-61; Miami Beach, FL, USA.

W. Jiang, J. Lennox, H. Schulzrinne and Kundan Singh; Towards Junking the PBX: Deploying IP Telephony; NOSSDAV '01; Jun. 25-26, 2001, pp. 177-185; Port Jefferson, NY.

H. Schulzrinne and E. Wedlund; Application-Layer Mobility Using SIP; Mobile Computing and Communications Review, vol. 4, No. 3, pp. 47-57.

Jiann-Min Ho; Jia-Cheng Hu and P. Steenkiste; A Conference Gateway Supporting Interoperability Between SIP and H.323; MM '01, Sep. 30-Oct. 5, 2001; pp. 421-422; Ottawa, Canada.

U. Varshney, A. Snow, M. McGivern and C. Howard; Voice Over IP; Communications of the ACM, Jan. 2002/ vol. 45., No. 1, pp. 89-96.

Colbert RO; Compton DS; Hackbarth RL; Herbsleb JD; Hoadley LA and Wills GJ; Advanced Services: Changing How We Communicate; Lucent Technologies, Bell Labs Technical Journal, vol. 6, No. 1, Jan.-Jun. 2001; pp. 211-228.

Grech MLF; Providing Seamless Services for VoIP Mobile Data Networks Using Camel/In Concepts.; First International Conference on 3G Mobile Communication Technologies (Conf. Publ. No. 471), pp. 133-137, London, UK, 2000.

\* cited by examiner

ENABLING COLLABORATIVE APPLICATIONS USING SESSION INITIATION PROTOCOL (SIP) BASED VOICE OVER INTERNET PROTOCOL NETWORKS (VOIP)

BACKGROUND OF THE INVENTION

1. Field of the Invention

The present invention relates to computer networks, and more particularly to Voice over Internet protocol (VoIP) networks using Session Initiation Protocol (SIP), for enabling applications to integrate VoIP.

2. Description of the Related Art

Session Initiation Protocol (SIP) is emerging as the vehicle for enabling VoIP in enterprise and carrier networks. So far, desktop applications and email clients, or web-browsers were not enabled with voice or are decoupled from voice applications.

SIP or Session Initiation Protocol is gaining ground both within enterprise networks and service provider networks as the vehicle for providing Voice Over IF (VoIP) and new multimedia services. Most VoIP applications today are stand-alone applications such as an IF Softphone, which runs on a user laptop allowing a user to place and receive voice calls. In addition, SIP is also in use for supporting Instant Messages between a client machine and a server machine. However, the SIP support is bundled with individual applications such an IM client or an IP softphone, and individual applications must run their own SIP support. This may create problems when multiple SIP protocol stacks are operational, e.g. SIP often uses port 5060 for its operation. If the bundled SIP stack within an application uses this port, it would mean that no other SIP application will be able to run on this port. More importantly, this is wasteful of system resources.

As the adoption of SIP based services grows, there is a need for desktop applications to invoke SIP in a uniform way. A further need exists for a framework for enabling applications with VoIP using SIP (Session Initiation Protocol).

SUMMARY OF THE INVENTION

The present invention provides SIP service to invoke voice services, such as connection setup, subscription to events, use of softphone for media exchange, etc. The present disclosure describes multiple ways of recognizing SIP URLs (uniform resource locator) at client applications. When client applications click on SIP URLs, the SIP service is invoked to setup a session corresponding to the URL. In one example, a programmatic interface to the SIP service permits a set of messages to be exchanged between an application and the SIP service.

A method and system for enabling voice over Internet for computer applications includes registering session initiation protocol (SIP) as a system service and providing SIP service through an application programming interface (API) to permit access to service functions by individual software applications. A SIP link is provided within a software application to permit user invocation of SIP service functions. The link may be passed as a parameter to permit external access to an invoked service function.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
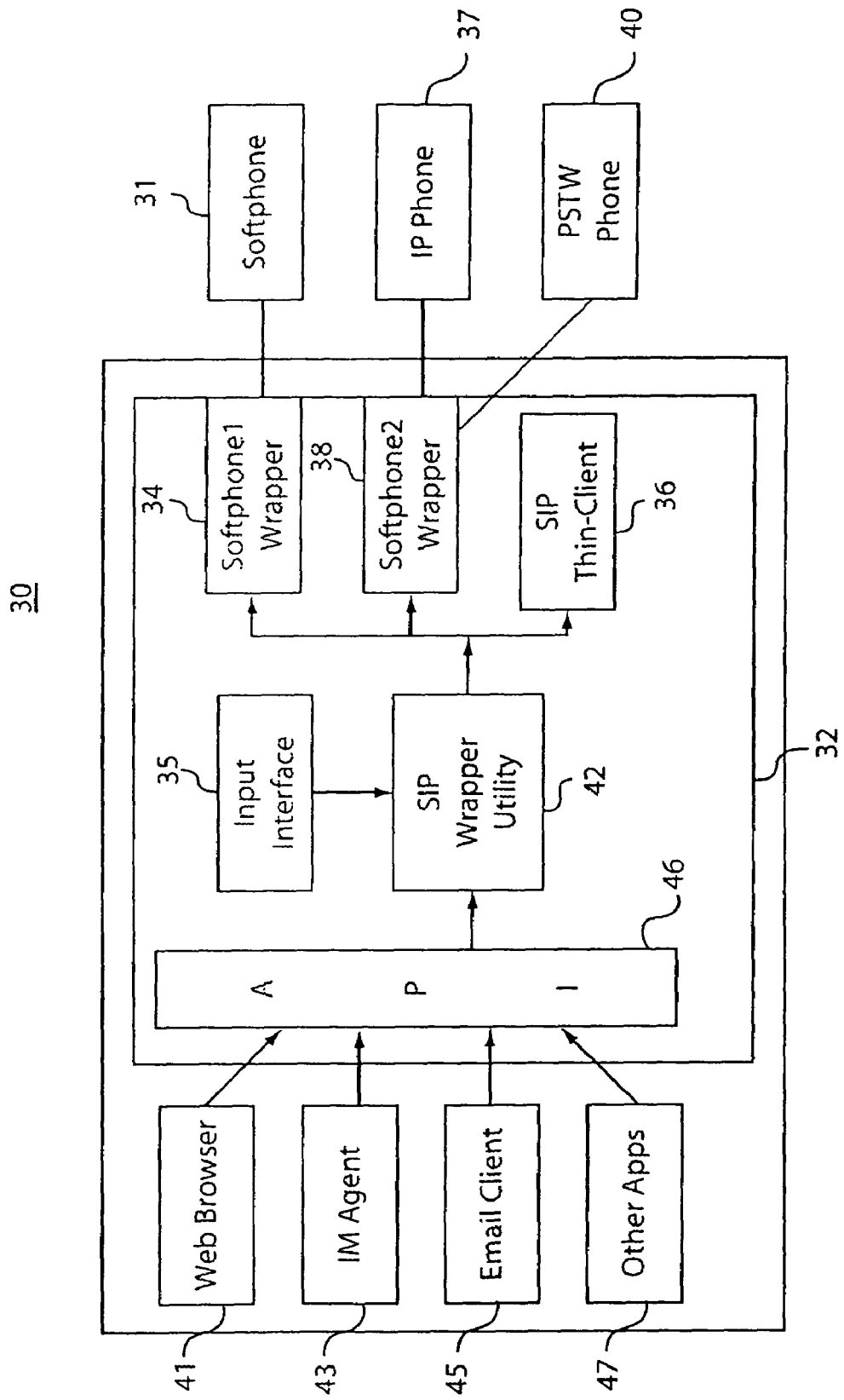
FIG. 1 is a block diagram showing a system for enabling SIP service in a client machine.

The present invention provides a core framework for enabling applications to use Session Initiation Protocol (SIP) based Voice over Internet protocol (VoIP). In accordance with the present invention, SIP is made a recognizable protocol at a system level along with a protocol handler that is considered a system service available to all applications on the system, e.g. a SIP URL may be highlighted as a 'clickable link' within an application and the SIP protocol handler is invoked on clicking the link.

SIP may be employed for enabling VoIP in enterprise and carrier networks. Desktop applications such as SAMETIME® (Instant Messaging) and email clients (LOTUS NOTES®), or web-browsers (such as Internet Explorer® (IE) or Netscape®) were either not enabled with voice or were decoupled from voice applications. However, in accordance with the present invention, with SIP-based VoIP, which is a text-based HTTP like protocol, it now becomes possible to at least (a) add another mode of user interaction/control to standard applications, e.g., voice (b) integrate the functionality of traditional telco-style applications such as teleconferencing, very easily into applications using SIP, (instead of using a separate mechanism to invoke such services) and (c) give rise to newer functionality arising out of tighter coupling between data and voice based applications, e.g., on-demand conferencing from applications.

The present invention provides a system and method for making a SIP protocol handler available to applications by registering the SIP protocol handler with the operating systems. The SIP protocol handler is registered with individual applications. A SIP service is advantageously created using a commercially available softphone but building additional components such as a SIP stack within a Thin Client for control purposes around the softphone. In addition, an integrated implementation is built including a media component, signaling component and an application program interface (API) for applications to invoke the SIP service. The API is provided by the SIP protocol handler ("soft phone") that can be invoked by any application to pass parameters and control information between the soft phone and the application. The core framework provides multiple instances of an application, which may be run on different client machines, for example, exchange SIP URIs (uniform resource identifier) amongst themselves using application-specific methods. In other words, a user may send a Same Time (ST) instant message (IM) including a SIP conference URI inviting other ST users to join a VoIP conference.

One advantage of this framework is a more efficient system due to strong coupling between the SIP infrastructure and collaborative applications. This results in lower delay in setting up voice calls, allows applications to make use of native SIP capabilities which may otherwise be lost if additional layers/components are injected between applications and SIP, and leads to a more robust system since there are no additional protocols (and servers) needed beyond the SIP infrastructure.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces. Referring now to the drawings in which like numerals represent the same or similar elements and initially to FIG. 1, a system 30, which provides SIP service, is illustratively shown. System 30 preferably provides SIP service on a client machine 32 which may include an integrated software implementation which provides SIP signaling for call setup and teardown and SIP signaling for call transfer to an external IP or PSTN phone 37. SIP signaling may be employed to subscribe to events occurring on other devices/phones, e.g., indications of other users telephone status, for example, is the user free or on the phone. SIP signaling may be used to notify other interested subscribers of occurrences of pre-defined events on the client machine 32.

A SIP softphone 31 provides basic call setup and teardown functions directly from the client machine 32 along with a facility for transmitting and receiving voice packets as well as other data. A SIP thin client 36 invokes SIP signaling for call setup and teardown from an Internet Protocol (IP) phone 37 or publicly switched telephone network (PSTN) phone 40 external to the client machine 32. In one example, given a SIP URL, a client dials that URL either using a third party softphone 31 or an external device (depending upon user input from input 35). The SIP URL can either be a SIP address of another user agent or can be a conference URL. The client can also create a conference and invite multiple users to join in. Given a list of user SIP URLs, the client creates a new conference and invites those users into that conference by clicking on hypertext links using SIP.

A SIP wrapper 42 functions based on user input 44, and passes process control to either the thin client 36 or the softphone 31. Wrapper 42 may be employed to modify media parameters for a call in progress, e.g., Voice codec. Wrapper 42 preferably includes application logic, which recognizes SIP URLs and makes them action items. The logic permits the user to take action to choose one of the function or functions desired for the SIP service API (See e.g., FIG. 2). The application logic is preferably programmable in software.

A SIP API 46 permits different applications 41, 43, 45, and 47 to access the SIP service, e.g., web-browser, IM agent, email client, teleconference, etc. API 46 may transmit/receive media packets to/from the client machine 32, e.g., RTP voice packets, and provides a programmatic interface that permits other applications on the client machine 32 to invoke any of the above functionality (see also, e.g., FIGS. 2).

The SIP Service is designed to run as a system service, taking care of the VoIP communications for that machine. The Service is started at boot-time and it initiates a user-selected softphone 31 to enable receiving VoIP calls on the machine directly. Along with that it waits for any user commands (from its APIs) to perform desired functions. As an example, the user may click on an SIP URL in an INTERNET EXPLORER® window, which will make our protocol handler write on the SIP service socket a message indicating to place the desired call. Internally, the SIP Service may include the following sub units:

Application Interface 46—This is responsible for receiving commands and parsing them.

SIP Wrapper Utility 42—This is responsible for invoking the appropriate device wrapper for the softphone 31/SIP thin client 36 depending upon the command sent on the SIP service socket.

Input Interface 35—This is responsible for collecting additional input needed to perform desired functions e.g. choice of a device to place a call.

Device Wrappers 34 and 38—These are wrappers to various softphones available on the machine. These are interfaces to make a third-party softphone 31 perform the functionality we desire.

SIP Thin-Client 36—This is a small SIP client, which acts as a back-to-back user agent when a call is to be received on a hardphone outside the machine. Thin-Client 36 talks to the called party and also sets up a SIP session with the device to be used for making the call and sets their media ports to talk to each other.

The SIP Service currently supports APIs, for example:
ExternalJoin:
    <ExternalJoin ccid="sip:1619@research.ibm.com"/>

This indicates that a call is to be made to "1619@research.ibm.com" and no SIP device has been selected. This would mean that the input interface 35 needs to get an input device from the user before making the call.
Join:
    <Join ccid=sip:1619@research.ibm.com>
    <Add pid=sip:88636923@research.ibm.com/
    </Join>

This directs the SIP Service to call "sip:1619@research.ibm.com" using device "sip:88636923@research.ibm.com". For use of a softphone 31, the pid field is replaced by an identifier for the softphone 31, for example: SJPhone, Pingtel.
SameDeviceJoin:
    <SameDeviceJoin ccid=sip:conf2@hawsipconf.watson.ibm.com/>

The SIP service finds out the current device, hangs up the current call and does a new call to:"sip:conf2@hawsipconf.watson.ibm.com".

This is used for automatic switching of calls, e.g., switch a conference based on a URL click. In case no device has been currently selected, it does an ExternalJoin to get a device and then proceeds.
Invite:
<Invite>
    <Add pid=sip:1619@research.ibm.com/>
    <Add pid=sip:88636923@research.ibm.com/>
    </Invite>

Invite users 1619, 88636923 into the current conference the initiator is in, if existing, or start a new ad hoc conference and invite the users.

Figure 2:
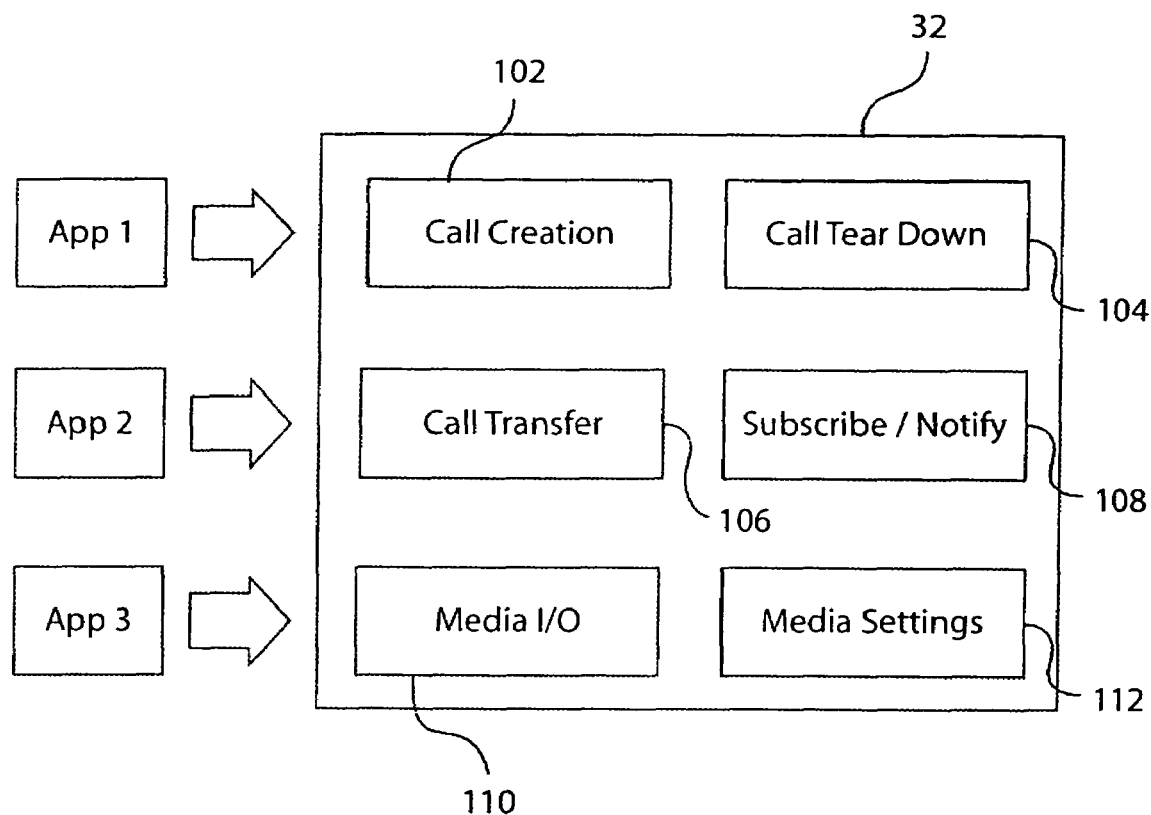
FIG. 2 is a schematic diagram showing a plurality of functionalities provided to a client machine by employing the SIP service.

Referring to FIG. 2, a schematic diagram illustratively shows service functionality of client system 32. It is noted that the list of features is illustrative and may include more or less features than indicated and described herein. Upon appropriate standardization of SIP related features, the whole SIP Service, protocol handler and softphone/SIP thin-client features may be employed as units of a single product component. This component acts as a softphone as well as facilitating infrastructure to use external devices.

The service would itself be able to create/tear-down calls (102, 104). Other call features will be incorporated into this improved system. Such features include call transfers (106), handling concurrent multiple calls, etc. The system includes better features for handling media support directly, e.g., user can command the service to change its media settings. Media I/O (110) will also be the responsibility of this service by using device wrappers (as opposed to other devices). In addition, SUBSCRIBE/NOTIFY mechanisms 108 will also be linked to the service. It would be a common interface to all applications using this SUBSCRIBE/NOTIFY mechanism 108.

The illustrative function provided in accordance with one embodiment of the present invention will now be described. In block 102, call creation is permitted in a desktop environment. A click of a link would place a call to an IP or PSTN telephone external to client 32. Similarly, calls can be terminated in block 104. Call transfer 106 may be performed by clicking a hypertext link or an icon for a particular person or machine. A subscription or notification message may be set up in block 108. This may include, for example, indicating to the system 30 that client machine 32 be alerted to a status of another telephone system or SIP based VoIP system. In other words, is that person or machine available for a phone call.

In block 110, media packets may be transmitted/received to/from the client machine 32, e.g., voice packets (RTP). In block 112, media settings can provide a programmatic interface that permits the user to enable other applications on the client machine 32 to invoke the SIP based functionality.

With continued reference to FIGS. 1 and 2, specific applications, which may be SIP-enabled using the above framework, may include email clients (or calendar entries). Conference notices sent via email may include a SIP URI pointing to a scheduled conference. Clicking on this link causes the email client (e.g., LOTUS NOTES®) to invoke a SIP soft phone 31 with the URI, which automatically joins the user to the conference identified by the link.

Another SIP based application includes instant messaging (IM) for clients. An IM user could create a SIP conference URI and distribute it to other users via an IM. The SIP conference link is highlighted in the recipients' IM window clicking on the link joins the user to the voice conference.

Alternatively, the IM user may invoke the SIP softphone 31 to create a conference on its behalf and pass it a list of intended conference participants. The SIP softphone 31 joins other users to the conference-using SIP signaling messages.

In another embodiment, Web click-to-call service may be provided. Web browsers are made to recognize SIP URLs (e.g., by adding an entry in an operating system registry by associating a protocol handler for SIP) . When a web page includes a SIP URI, this is recognized by the browser and shown as a 'clickable' link to the user. Clicking on this link causes the soft phone 34 to place a VoIP call to the URI, which may be for a point-to-point call or a multi-party conference.

In yet another embodiment, context information, e.g., an address book and meeting entries, are transferred from a user's desktop/laptop to an IP phone. This permits the IP phone to better handle incoming calls when a meeting is in progress (for example, return additional information back to the calling party about the duration of the meeting). Alternatively, the incoming call could be transferred to the user's laptop, where the SIP soft phone 34 looks up the user's context information to send a similarly informative response back the caller.

Another illustrative application includes user interactions with a web page to exchange information between, say, Java Script (and/or Java applet) and SIP applications (or applets). The display of web page interactions may be controlled by Java Script (and/or applets) and the context applied is supplied by the SIP application (or applet). The result of the web page interaction can also show a SIP URL or commands for click-to-call supported by the SIP application (or applet).

Figure 3:
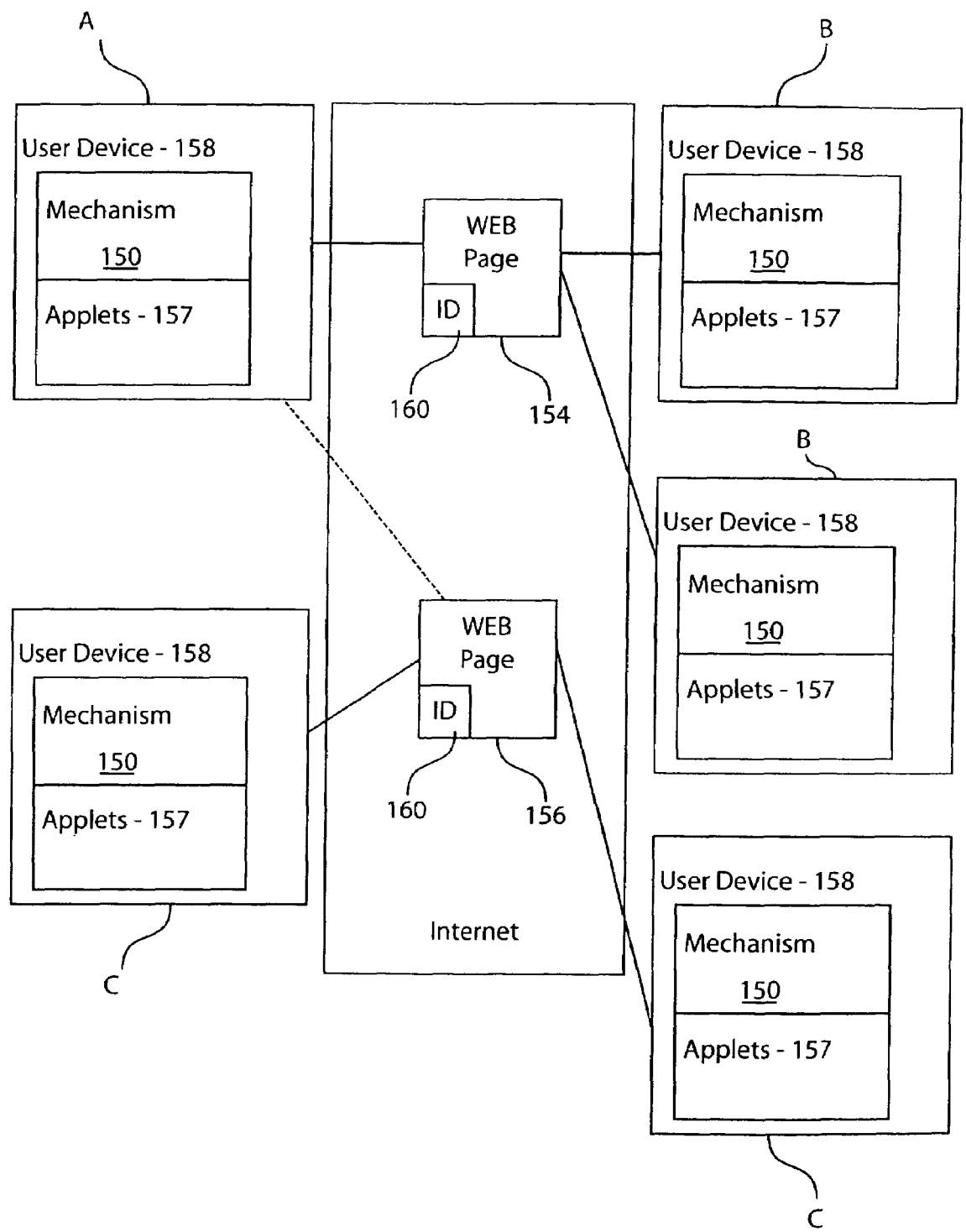
FIG. 3 is a block diagram showing a mechanism for creating a conference web page in accordance with the present invention.

Referring to FIG. 3, another innovative application of the baseline infrastructure in accordance with the present invention includes a mechanism 150 in which users viewing a common web page 154 are automatically set up in a conference. This permits a greater level of interaction between people looking at the same content. The user joins a conference by simply viewing the "enabled" web page 154 and is automatically switched to another conference when he moves to another page 156. For example, user A is involved with users B in a first voice conference call over the Internet. When user A selects a new web page 156, user A enters a new conference with users C. These voice conferences may include video and well as voice.

Mechanism 150 includes "enabled" pages, which include applets 157 (which can be visually zero in size). Each web page includes a distinct identifier 160 for the conference viewers would be a part of, and pass that as a common applet code as a parameter. The applet 157 then writes a SIP Service API command (e.g., SameDeviceJoin) for that conference on the users machine (to do this, signed applets may be used). When the user moves to another page, the applet from that page takes over and uses the SameDeviceJoin command, to automatically switch the user to the new conference.

Such a mechanism is useful for a variety of scenarios, e.g., discussion boards (where users discussing a topic can employ voice communication now), customer care (representatives can be conferenced with customers trying to report similar problems), etc.

Figure 4:
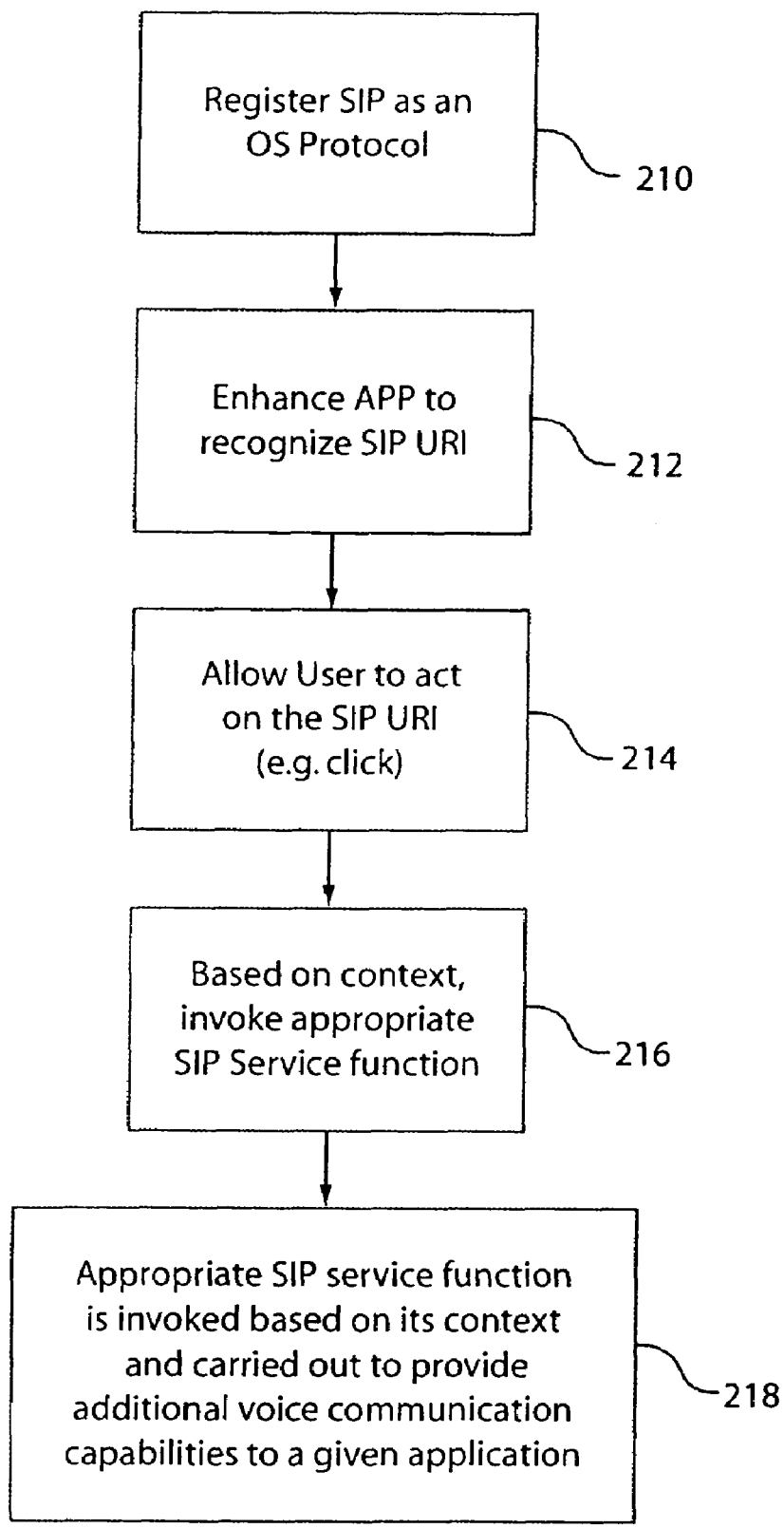
FIG. 4 is a flow diagram showing a method for implementing SIP service for applications that employ operating systems.

Referring to FIG. 4, a block/flow diagram is shown for enabling VoIP applications, which read operating system settings (e.g., a WINDOWS® Registry), for computer systems or networks. This may include, for example, applications like INTERNET EXPLORER®.

In block 210, a SIP (Session Initiation Protocol) is registered as a system service with an operating system by registering a SIP protocol handler. Using SIP as a protocol, for operating systems like WINDOWS®, which have a single common registry of protocols like http, ftp etc., the present invention registers SIP as another protocol. Then, any SIP URLs included in applications using that common registry (e.g., IE, OUTLOOK EXPRESS®) are immediately hyperlinked to be handled by the custom SIP protocol handler of the present invention.

This registration of the protocol is done by adding a new entry to the registry (using a .reg file or a direct entry using Registry Editory—regedit). The entry defines "sip" as a protocol and also declares a handler, which indicates the program that should handle any request generated by an action on these protocol items (similar to clicking an http URL). The handler can be a simple call to a softphone (to make an appropriate call) or can be a call to a running service. For operating systems not having such a feature, all desired applications have to be custom hooked to the protocol handler.

In block 212, an application-programming interface (API) provided by the SIP protocol handler allows individual applications to invoke the SIP service. This enhances the application to permit the introduction of SIP based URI's into the application to provide the functions of the present invention. SIP URLs ("links") are made recognizable within each application using methods specific to each application, and are preferably highlighted in the user interface of the application allowing users to click on the SIP link.

To use SIP, a few inputs from the user may be needed and features, which act as useful add-ons, are provided. An example of the input includes a device that is to be used to make that call; or select a hard IP phone, a hard PSTN phone or even a softphone from the user's PC. Useful features include the option to switch a call to another device and to dynamically move between calls.

To this end, a rich set of APIs can be used by the protocol handler. This API can be provided through a SIP service. The SIP service is actually responsible for doing all the SIP signaling and handshakes with parties being called. The protocol handler writes appropriate commands to the SIP service (this communication happens, preferably using XML messages on a socket).

In block 214, a user's selection (e.g., a mouse click) of the SIP link invokes the SIP service using the API, passing the highlighted URL as a parameter to the invoked service function. In this way SIP based VoIP is employed.

Block 216 may be employed on applications, which use SIP-based VoIP as a service. For example, a distributed application (e.g., an Instant Message client) may be used to pass SIP URLs to other instances of an application running on different user machines, thereby allowing different users to activate a common SIP URL, e.g. ad-hoc conferencing. This is made possible by providing the SIP based service since individual instances of the application will recognize SIP URLs.

In block 218, the appropriate SIP service function is invoked based on its context and carried out to provide additional voice communication capabilities to a given application.

Figure 5:
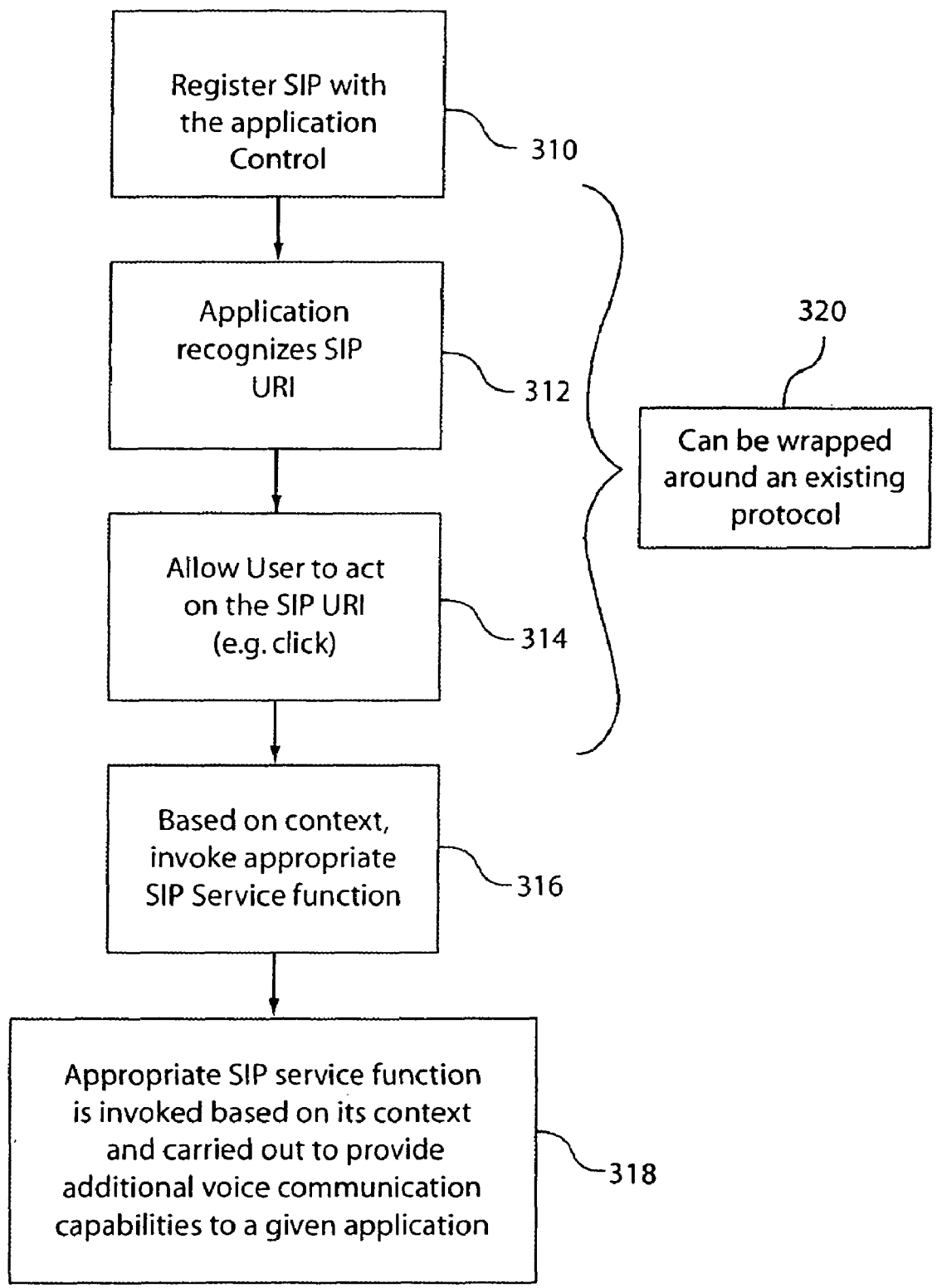
FIG. 5 is a flow diagram showing a method for implementing SIP service for applications that employ their own protocol definitions.

Referring to FIG. 5, a block/flow diagram is shown for enabling VoIP applications, which have their own protocol definitions (e.g., a LOTUS NOTES®), for computer systems or networks.

In block 310, a SIP (Session Initiation Protocol) is registered as a system service with application control logic. This may include registering a SIP protocol handler with the application control logic such as an application specific registry file.

For applications that do not consult the common registry (e.g., LOTUS NOTES® and other LOTUS® products) and also for operating systems that do not have such a registry mechanism, custom hook-ups are provided for all the applications that need to be enabled with VoIP. In such a case, three operations are preferably performed:

1. Make SIP URLs recognizable—The applications should be able to recognize SIP URLs
2. Make SIP URLs as action items—The user can click on a SIP URL to indicate performing an action
3. Call the appropriate handler that writes to SIP Service appropriate commands for desired functionality.

The LOTUS NOTES® application has a mechanism to define the Internet browser that a user can use for handling HTTP URLs. To allow the application to recognize SIP URLs without performing code modifications, SIP URLs are hidden within HTTP URLs like "http?sip: user@userdomain.com" and the Internet browser is set to be the custom handler (the same handler that was used in registry mechanisms). The handler is responsible for stripping out the "http?" prefix and writing the appropriate API message to the SIP Service socket.

It is noted that SIP URI registration, recognition and selection are preferably wrapped around an existing protocol (block 320). This makes setting up SIP based services easier and more compatible with a user's system.

In block 312, an application-programming interface (API) provided by the SIP protocol handler allows individual applications to invoke the SIP service. This enhances the application to permit the introduction of SIP based URI's into the application to provide the functions of the present invention. SIP URLs ("links") are made recognizable within each application using methods specific to each application, and are preferably highlighted in the user interface of the application allowing users to click on the SIP link.

In block 314, a user's selection (e.g., a mouse click) of the SIP link invokes the SIP service using the API, passing the highlighted URL as a parameter to the invoked service function. In this way SIP based VoIP is employed.

Block 316 may be employed on applications, which use SIP-based VoIP as a service. For example, a distributed application (e.g., an Instant Message client) may be used to pass SIP URLs to other instances of an application running on different user machines, thereby allowing different users to activate a common SIP URL, e.g. ad-hoc conferencing. This is made possible by providing the SIP based service since individual instances of the application will recognize SIP URLs.

In block 318, the appropriate SIP service function is invoked based on its context and carried out to provide additional voice communication capabilities to a given application.

Integration of SIP Service with an IM Client:

Conference services like creating a new conference, joining an existing conference etc. can be invoked from an instant messenger client like SAMETIME™. Users can create a unique conference URI on the fly and invite other people to join the conference. Conference URIs are of the type sip:conference-name@conference-server-domain (e.g., Sip:conf1@confserver.research.ibm.com). The conference URIs created by a user can be sent as part of text message to other members in the users' buddylist. The instant messenger application has the capability to recognize SIP URIs.

While creating or sending conference URIs, users have to ensure that URIs are of the sip:conference-name@conference-server-domain form. The IM client parses the chat messages for potential SIP URIs and on detecting any text that matches the sip:conference-name@conference-server-domain form, it recognizes it as a SIP URI and does a special handling of the URIs. SIP URIs are displayed as a clickable URL in the chat window (just like web page URLs) and specific actions are associated using mouse clicks on the conference URIs.

One clicking a conference URI in SAMETIME™ window, the conference specific parameters are extracted from the URI, and this information is passed via socket to the SIP wrapper residing on the user's machine. The information sent to the wrapper is preferably in XML format. The SIP wrapper then invokes the SIP service, which then takes appropriate action (either invoking the specified softphone on the user's machine or invoking the SIP thin client that communicates with the conference server using SIP protocol).

In addition to sending the conference URI to people who are online, people not online can also be invited to join the conference. This may be achieved by performing a lookup in a directory (e.g., a corporate online directory or the like) of the phone numbers of people that are not online or the user can directly specify any other phone number that they want to join the conference. The instant messenger application sends over a socket, the conference name, and the phone number is sent to the SIP wrapper. The SIP wrapper then invokes the SIP service appropriately and the SIP service uses SIP methods to invite these phone numbers to join the conference. (e.g., INVITE xyz@confserver.research.ibm.com) The conference server is already registered with the
SIP proxy and thus when SIP messages are sent out by SIP Thin client or the soft phone, these messages are routed correctly to the conference server based only on the host and domain name (xyz is ignored and the request is routed to confserver.research.ibm.com).

Upon appropriate standardization of SIP related features, the whole SIP Service, protocol handler and softphone/SIP thin-client features may be incorporated into a single product component, which acts as a softphone as well as facilitating infrastructure to use external devices. Alternately, these and other components may be packaged separately and provided in combinations such that the components may be assembled and work in cooperation.

Figure 6:
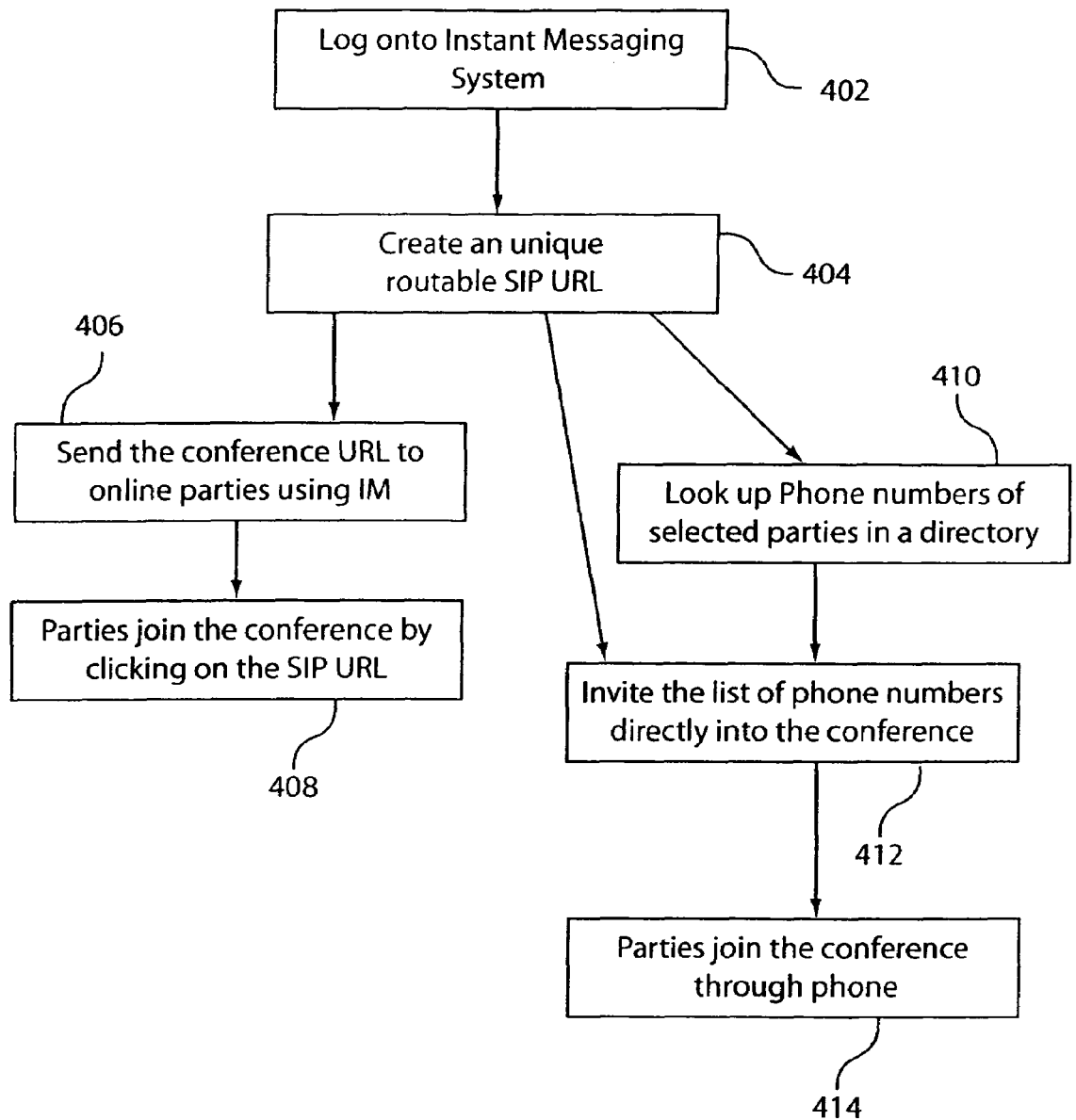
FIG. 6 is a flow diagram showing an illustrative application employing SIP service.

Referring to FIG. 6, an illustration of a particularly useful embodiment of the present invention will now be described in terms of a same time conference call. In block 402, access to an instant messaging system is initiated by a client. In block 404, a unique routable SIP URL is created. This URL may have been created in advance or may be created during the instant messaging session. After the SIP URL is made available, different paths may be taken.

In block 406, a conference SIP URL is sent to online parties, which were predesignated, e.g., on a contact list. The SIP URL are recognized by the parties. Then, in block 408, the predesignated parties join the conference using VoIP technology based on SIP. This may be performed by simply clicking on the URL sent to the parties.

Alternately, in block 410, phone numbers from a directory or addresses (email or URL's) for a list of parties is obtained. In block 412, the listed parties are invited using SIP service through appropriate channels (e.g., soft phone call, email, instant message, etc.) to permit the parties to directly join into the conference. In block 414, the parties join the conference by phone.

Alternately, step 410 can be bypassed if the phone numbers of the parties are already known or designated. Another example of using an IM client is also described.

Having described preferred embodiments of enabling collaborative applications using session initiation protocol (SIP) based voice over Internet protocol networks (VoIP) (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for enabling voice over Internet for computer applications, comprising the steps of
registering session initiation protocol (SIP) as a system service;
providing SIP service through an application programming interface (API) to permit access to service functions by individual software applications;
providing a SIP link within a software application to permit user invocation of SIP service functions to enable voice over Internet service within the software application; and
passing the link as a parameter to permit external access to an invoked service function to provide voice communication capabilities for the software application.

2. The method as recited in claim 1, wherein the step of registering includes registering a SIP protocol handler.

3. The method as recited in claim 1, wherein the step of registering includes registering the SIP with an operating system protocol.

4. The method as recited in claim 1, wherein the step of registering includes registering the SIP with application control logic for an application.

5. The method as recited in claim 1, wherein the step of providing SIP service through an application programming interface (API) includes recognizing SIP links within the application.

6. The method as recited in claim 5, further comprising the step of highlighting the SIP link in a user interface of the application to permit users to click on the SIP links.

7. The method as recited in claim 1, wherein the SIP link includes a URL and the step of passing the link as a parameter includes passing the URL to another party.

8. The method as recited in claim 1, further comprising the step of initiating a conference call by passing the link to other parties to permit the other parties to join the conference call.

9. The method as recited in claim 8, wherein the application includes a distributed application and the SIP link is passed to the distributed application running on other user platforms permitting a plurality of parties to have access to the same SIP link.

10. The method as recited in claim 9, wherein the distributed application includes one of an instant messaging program, a teleconferencing program, and an email program.

11. A program storage device readable by machine, tangibly embodying a program of instructions executable by the machine to perform method steps for enabling voice over Internet for computer applications as recited in claim 1.

12. The method as recited in claim 1, wherein the external access includes setting up a common web page to set up a voice conference with a plurality of users.

13. A method for enabling voice over Internet for computer applications, comprising the steps of
registering session initiation protocol (SIP) as a system service;

providing SIP service through an application programming interface (API) to permit access to service functions by individual software applications by recognizing SIP links within the application and highlighting the SIP link in a user interface of the application to permit users to select the SIP links to enable voice over Internet service within the software application; and passing the link as a parameter to permit external access to an invoked service function to provide voice communication capabilities for the software application.

14. The method as recited in claim 13, wherein the step of registering includes registering a SIP protocol handler.

15. The method as recited in claim 13, wherein the step of registering includes registering the SIP with an operating system protocol.

16. The method as recited in claim 13, wherein the step of registering includes registering the SIP with application control logic for an application.

17. The method as recited in claim 13, wherein the SIP link includes a URL and the step of passing the link as a parameter includes passing the URL to another party.

18. The method as recited in claim 13, further comprising the step of initiating a conference call by passing the link to other parties to permit the other parties to join the conference call.

19. The method as recited in claim 18, wherein the application includes a distributed application and the SIP link is passed to the distributed application running on other user platforms permitting a plurality of parties to have access to the same SIP link.

20. The method as recited in claim 19, wherein the distributed application includes one of an instant messaging program, a teleconferencing program, and an email program.

21. The method as recited in claim 13, wherein the external access includes setting up a common web page to set up a voice conference with a plurality of users.

22. A program storage device readable by machine, tangibly embodying a program of instructions executable by the machine to perform method steps for enabling voice over Internet for computer applications, the method steps comprising:

registering session initiation protocol (SIP) as a system service;

providing SIP service through an application programming interface (API) to permit access to service functions by individual software applications by recognizing SIP links within the application and highlighting the SIP link in a user interface of the application to permit users to select the SIP links to enable voice over Internet service within the software application; and passing the link as a parameter to permit external access to an invoked service function to provide voice communication capabilities for the software application.

23. A system for providing a session initiation protocol (SIP) service on a client machine, comprising:

a SIP softphone, which transmits and receives voice packets and provides basic call setup and teardown functions directly from a client machine;

a SIP thin client, which invokes SIP signaling for call setup and teardown from an external entity to the client machine;

a SIP wrapper, which based on user input, passes control to either the thin client or the softphone; and a SIP application programming interface (API), which permits different applications to access SIP service.

24. The system as recited in claim 23, wherein the external entity includes one of an Internet Protocol (IP) phone and a publicly switched telephone network (PSTN) phone.

25. The system as recited in claim 23, wherein the client machine includes an integrated software implementation for SIP signaling for call setup and teardown.

26. The system as recited in claim 23, wherein the client machine includes an integrated software implementation for SIP signaling for call transfer the external entity.

27. The system as recited in claim 23, wherein the client machine includes an integrated software implementation for SIP signaling to subscribe to events occurring on other devices/phones.

28. The system as recited in claim 23, wherein the client machine includes an integrated software implementation for SIP signaling to notify other interested subscribers of occurrences of pre-defined events on the client machine.

29. The system as recited in claim 23, wherein the client machine includes an integrated software implementation for transmitting/receiving media packets to/from the client machine.

30. The system as recited in claim 23, wherein the client machine includes an integrated software implementation for modifying media parameters for a call in progress.

31. The system as recited in claim 23, wherein the client machine includes an integrated software implementation for a programmatic interface that permits other applications on the client machine to invoke SIP functions.

* * * * *